Dec. 26, 1944.  H. E. HEIGIS  2,365,700
EMERGENCY ACTUATING SYSTEM FOR FLUID MOTORS
Filed May 8, 1941  2 Sheets-Sheet 2
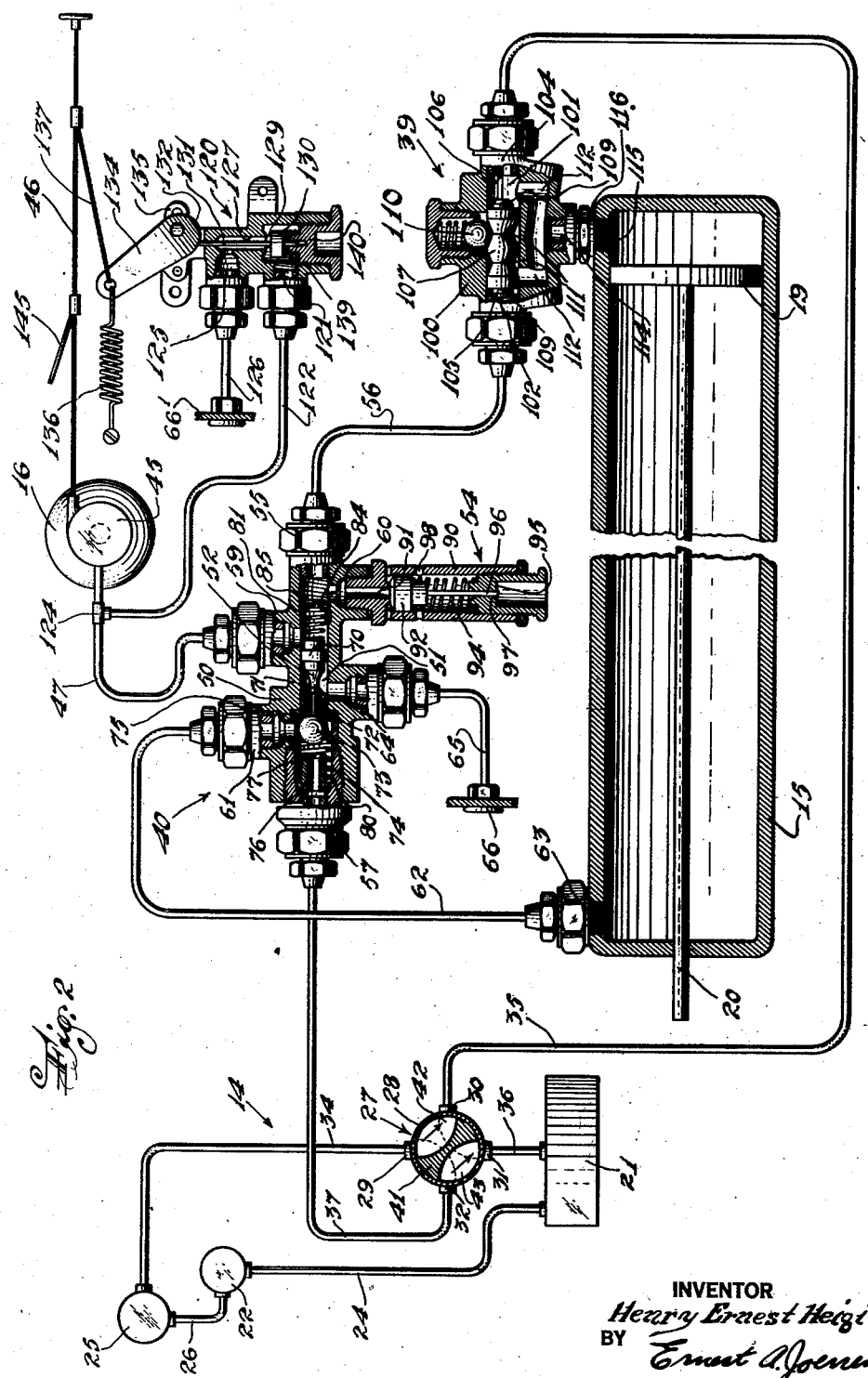
INVENTOR
Henry Ernest Heigis
BY
Ernest A. Joenen
ATTORNEY Patented Dec. 26, 1944

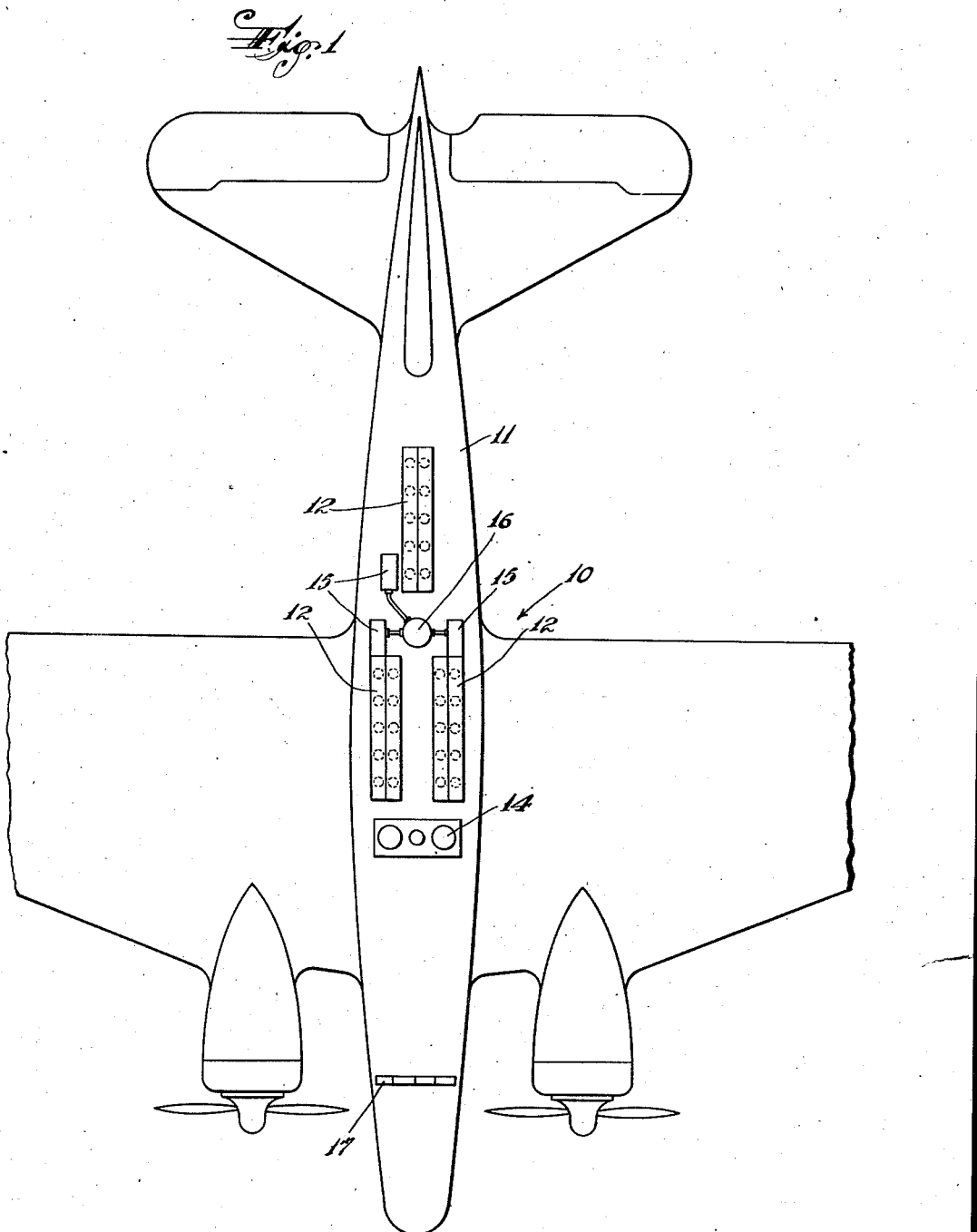

2,365,700

UNITED STATES PATENT OFFICE 2,365,700

EMERGENCY ACTUATING SYSTEM FOR FLUID MOTORS

Henry Ernest Heigis, West Orange, N. J., assignor to Specialties Development Corporation, Bloomfield, N. J., a corporation of New Jersey Application May 8, 1941, Serial No. 392,447

6 Claims. (Cl. 121—46.5)

The present invention relates to fluid pressure controlled apparatus; and more particularly to fluid pressure controlled apparatus for effecting normal and emergency operation of accessory gear or devices of aircraft and the like, and to a method of operating such apparatus.

Airplanes and seaplanes usually are provided with one or more accessory devices, mechanisms, or gear, for accomplishing operations which are incidental to the flight of the plane. For example, airplanes may be provided with retractible and extensible landing gear. Bombing planes may be provided with mechanism for opening bomb bay doors prior to releasing the bombs or other explosive charges, and for closing the doors after dropping the bombs or charges. Other types of planes, such as transport planes, may be provided with mechanism for opening and closing doors or hatches from which the passengers of the plane may parachute or through which the cargo of the plane may be dumped. Such mechanisms preferably are operated by liquid pressure motors or hydraulic pressure actuated apparatus; for example, comprising a cylinder, a piston in the cylinder actuated by a hydraulic pressure medium, and suitable means for operatively connecting the piston to the landing gear or doors. Usually, the hydraulic pressure medium employed is an oil of the mineral oil type which is compressed by a compressor system to exert a pressure of about 950 pounds per square inch.

The difficulty with hydraulic apparatus of the foregoing type is that it operates the doors, landing gears or the like, rather slowly and in an emergency does not have the required speed and power to effect almost instantaneous operation. Frequently, bombing planes taking off with a load of bombs are unable to attain an altitude required to clear buildings, structures or natural obstructions at the airport, either due to engine trouble or other causes primarily due to the heavy load carried by the plane. Under such circumstances it is imperative to release the bombs in a minimum period of time to enable the plane to lighten its load in order to gain altitude or to permit the plane to land safely. Another contingency which frequently arises is that when a plane is preparing to land, the landing gear may be jammed in its retracted position and cannot be extended because the hydraulic apparatus lacks the power to move the landing gear. A similar contingency may arise in connection with other doors or hatches used primarily for the escape of passengers or the dumping of cargo.

The present invention aims to overcome the foregoing difficulties by providing apparatus for effecting operation of doors, hatches or landing gear and the like, which under normal conditions is actuated by a hydraulic pressure medium and in an emergency is actuated by a gaseous pressure medium which may have a greater pressure than the hydraulic medium and which is reserved solely for emergency operation. The invention further contemplates discharging, preferably to the atmosphere, the hydraulic medium in the fluid motor or the cylinder, so that the gaseous medium is more effective to provide rapid and positive operation. In addition, the invention aims to relieve excessive pressure due to the gaseous medium which might damage the apparatus, and to vent the gaseous pressure medium to the atmosphere prior to or after actuation of the apparatus by the gaseous pressure medium, to prevent premature or accidentally released or trapped gaseous medium from accidentally actuating or interfering with the actuation of the apparatus.

An object of the present invention is to provide an improved apparatus for operating bomb bay doors, landing gear and the like, which is simple and economical in construction, rapid and positive in operation in the event of an emergency, and which can be readily installed.

Another object is to provide control devices for apparatus of the foregoing type, which adapt the apparatus for normal hydraulic actuation and for gaseous actuation in the event of an emergency.

Another object is to provide an improved apparatus which does not materially increase the weight of the plane and comprises a minimum number of parts, fittings and connections.

Another object is to provide an improved apparatus which requires a minimum amount of servicing and repair and can readily withstand rough usage.

A further object is to provide an improved method of controlling and actuating apparatus for effecting operation of accessory gear, mechanisms or devices of aircraft, and the like.

Other and further objects, not specifically enumerated above, will be apparent when described in greater detail in connection with the accompanying drawings, wherein;

Figure 1 is a diagrammatic plan of a bombing plane having apparatus for operating the bomb bay doors thereof, illustrating an embodiment of the invention.

Figure 2 is an enlarged schematic view of the door operating apparatus, illustrating the principal parts in section.

Referring to Figure 1 of the drawings, there is shown an airplane 10 of the bomber type having a fuselage 11. The fuselage may have one or more bomb compartments or bays for storing bombs or other suitable explosive charges usually placed on racks or supports from which they may be released and dropped. In the illustrative embodiment three bomb compartments are shown and each compartment is provided with a door 12 or a pair of doors at the underside of the fuselage through which the bombs may be dropped.

The doors are adapted to be opened and closed, under normal conditions, by a hydraulic system or apparatus, comprising a reservoir, a pressure pump and an accumulator, herein shown diagrammatically at 14, which actuates a fluid pressure motor, such as an individual cylinder and piston arrangement 15 for operating each of the doors or each set of doors. The doors are adapted to be opened, or opened and closed if desired, when an emergency arises by utilizing a source of gaseous pressure medium stored in a container 16 for actuating the fluid pressure motor. Suitable valves, connections, and control devices are provided, which will be described in detail in connection with Figure 2, and operation of the doors, either by a hydraulic medium or a gaseous medium may be controlled by suitable devices on the instrument and control panel 17 of the plane.

Referring to Figure 2, there is shown in detail a cylinder 15, a door operating piston 19 in the cylinder, and a piston rod 20 secured to the piston and adapted to be operatively connected by suitable linkage (not shown) to a bomb bay door or the like. The piston 19 is adapted to be moved in either direction by a liquid pressure medium supplied by the hydraulic system 14 which comprises an oil reservoir 21, a pump 22 for withdrawing oil from the reservoir through a pipe line 24, a hydraulic accumulator 25 for receiving oil under pressure from the pump through a pipe 26, and a direction valve 27 adapted to selectively direct the oil under pressure to either end of the cylinder 15 and to permit the oil at the other end of the cylinder to return to the reservoir 21.

The valve 27 has a cylindrical casing 28 provided with four ports 29, 30, 31 and 32, spaced 90° apart, and pipes or conduits, 34, 35, 36 and 37 connect the ports 29, 30, 31 and 32 to the accumulator 25, to a control valve 39, to the reservoir 21, and to a control head 40, respectively. A rotatable valve cylinder 41 is positioned in the valve casing 28 and is adapted to be turned from one position to another by a suitable manually operable handle (not shown). The valve cylinder 41 has a pair of passages 42 and 43, each adapted to connect any pair of the ports which are spaced 90° apart.

The container 16 may be a high pressure cylinder provided with a device 45 for releasing the gaseous pressure medium, in response to pulling a cable 46, and a conduit 47 for conducting the medium to the control head 40. In practice compressed air is stored in the container at a pressure between about 1300 and 2000 pounds per square inch and, preferably, at 1800 pounds per square inch, at 70° F.

The hydraulic system 14 for operating the piston 19 under normal conditions and the source of high pressure gaseous medium are operatively connected to the cylinder 15 by the control head 40 and the valve 39, which will now be described in detail.

The control head 40 comprises a tubular body or casing 50 having a cylindrical bore 51 extending from end to end, a slidable valve member 52 positioned in the bore, and a relief valve 54. One end of the bore has a port 55 connected by a pipe or tube 56 to the control valve 39 and the other end of the bore has a port 57 connected to the direction valve 27 by the pipe or tube 37. Adjacent the port 55, a port 59 is provided having the gaseous pressure medium conducting tube 47 connected thereto and which, by means of the bore 51, is in communication with the port 55. Intermediate the ports 55 and 59, a port 60 is provided which has the relief valve 54 operatively connected thereto. At the other end of the control head casing and adjacent the port 57, there is provided a port 61 connected by a pipe or tube 62 to a port 63 at one end of the cylinder, and intermediate the ports 59 and 61 a port 64 is provided which is connected by a pipe 65 to a discharge port 66 located outboard of the fuselage of the plane.

In the apparatus illustrated herein, the control head 40 is designed to permit high pressure oil or other hydraulic medium to enter the port 63 of the cylinder and move the piston toward the right to effect, for example, closing of a bomb bay door. Under normal conditions of operation, that is, when the door is opened by oil or hydraulic medium entering the cylinder at the right hand end thereof, the control head is adapted to permit the oil in back of the piston to return to the reservoir while the piston moves toward the left. During emergency operation, the control head is adapted to close the return line 37 and to direct the oil in back of the cylinder to flow to the outboard discharge port 66.

In order to accomplish the foregoing, the valve member 52 cooperates with valve seats positioned in the control head and is maintained in one operating position by resilient means and is moved into another operating position in response to the gaseous pressure medium released from the container 16 during emergency operation.

For this purpose the valve member 52 is provided with a piston or plunger portion 70 at one end which fits snugly for sliding movement in the bore and is normally adjacent the gaseous pressure medium inlet port 59 to enable the gaseous pressure medium to move the valve member 52 towards the left. A shank portion 71, of reduced diameter, is secured to the piston portion 70 which may be provided with fins 72 to slidably guide it in the bore of the control head. The other end of the shank portion 71 carries a valve plug which may be in the form of a spherical portion or ball 73, which is positioned in a portion 74, of the bore 51. The portion 74 is of slightly greater diameter than the bore 51 and is located intermediate the ports 57 and 64.

To the right of the ball 73, the bore of the control head is provided with a valve seat 75 upon which the ball is adapted to seat and shut off communication between the port 64 and the enlarged bore portion 74. The port 57 has a tubular member 76 extending inwardly into the enlarged bore portion 74 which, at its inwardly facing end is provided with a valve seat 77 adapted to be engaged by the left side of the ball 73 to shut off communication between the port 57 and the bore portion 74. A cylindrical helical spring 80 engages the ball 73 and normally urges it against the valve seat 75 and a second but relatively weak spring 81 engages the piston portion 70 at the other end of valve member 52. The spring 80, preferably, is positioned in an annular space provided between the bore portion 74 and the tubular member 76, while the spring 81 may be retained under adjustable compression by a perforated plug 84 threaded into the bore of the control head at 85.

The relief valve 54, which preferably is part of the control head, may be of the pop valve type. This relief valve, as illustrated herein, comprises a casing 90 having one end threaded into a socket adjacent the port 60, a valve seat 91 in the casing, and a valve member 92 urged against the seat 91 by a spring 94. The spring 94 is retained and is adapted to be adjustably tensioned by a plug 95 screwed into the lower end of the relief valve casing. If desired, the valve member 92 may have a depending stem 96 which extends through and is guided by an aperture 97. In the event the pressure of the gaseous medium passing through the bore 51 becomes excessive, the valve member 92 is moved away from the seat 91 in opposition to the spring 94 and the pressure of the gaseous medium escapes through suitable apertures 98 in the casing 90.

The valve 39 cooperates with the control head 40 to cut off the supply of oil or other hydraulic pressure medium to the right side of the cylinder in response to the release of the gaseous medium and admits the gaseous medium to the cylinder to move the piston toward the left. To accomplish this, the valve 39, generally known as a shuttle type valve, may comprise a casing 100 having a longitudinal bore 101, an air inlet port 102, at one end of the bore connected to the tube 56, and an oil inlet port 104 at the other end of the bore connected to the pipe 35. Adjacent the port 102, a valve seat 105 is provided and a similar valve seat 106 is provided adjacent the port 104. A slidable valve member or shuttle 107 is positioned in the bore 101 which has a valve seat engaging portion 109 at each end, adapted to close the ports 102 and 104. The valve member 107 is frictionally held against shifting accidentally by a spring pressed ball member 110 adapted to seat in circumferential grooves 111 in the valve member 107. The valve casing 100 is further provided with conduits 112 leading from the bore 101 to an outlet port 114 which is operatively connected with an inlet port 115 at the right hand end of the actuating cylinder 15.

The valve 39 preferably is mounted on the cylinder 15 by providing the casing with a nipple 116 at the outlet port 114 which is threaded into the inlet port 115 of the cylinder, whereby a short connection between the valve 39 and the cylinder is provided. It will be understood that, if desired, the valve could be designed as part of the control head, whereby the connection between the valve 39 and the control head 40 is eliminated.

In order to prevent gaseous pressure medium from being trapped in the pipe 47 connecting the container 16 and the control head 40 after release of the medium, suitable venting means cooperating with the gas release actuating cable 46 are provided. These venting means also serve to vent the gaseous medium to the atmosphere in the event the gaseous medium is released accidentally due to excessive pressures developed in the container, whereby the gaseous medium will not operate the valve 39, control head 40 and the piston 19 in the cylinder 15. Such venting means preferably comprise a vent valve 120 which normally is open and is closed only while the cable 46 is pulled to release the gaseous medium from the container 16.

The vent valve 120 comprises a casing having an inlet port 121 connected by a pipe or tube 122 to a T-fitting 124 in the pipe 47, and having an outlet port 125 connected by a pipe or tube 126 to an outboard discharge port 66'. Intermediate the inlet port 121 and the outlet port 125, the valve casing is provided with a bore 127 having a downwardly facing valve seat 129 adapted to be engaged by a valve member 130 to shut off communication between the inlet and outlet ports. The valve member 130 is provided with a stem 131 extending through the upper end of the valve casing and is adapted to be engaged by the cam surface 132 of a lever 134 pivotally mounted on a bracket 135 attached to the valve casing. The cam surface is designed so that it is effective to move the valve stem downwardly and to maintain it in its downward position when lever 134 is held in its normal position by a spring member 136 having one end attached to the upper end of the lever. The lever is operatively associated with the gas release actuating means by a cable 137 attached to the cable 46, whereby when the cable 46 is pulled to effect release of the gaseous medium, the cable 137 moves the lever into a position in which the cam surface 132 permits the stem 131 to move upwardly. Upward movement of the stem and the valve member thereon is effected by a spring 139, positioned in the bore 127 to engage the valve member and maintained in a position to urge the valve member upwardly by an adjustable spring tensioning plug 140 threaded into the bore. During release of the gaseous medium the spring 139 holds the valve member 130 against the seat 129 to prevent the escape of gas through the vent or discharge port 66'.

While the hydraulic and pneumatic systems are illustrated and described, by way of example, in connection with a single door actuating cylinder, it will be understood that any desired number of actuating or working cylinders may be operated by the source of hydraulic pressure medium and the gaseous pressure medium.

The emergency gas release cable 46 may be utilized for effecting the release of springs or other suitable devices for holding the bombs in the bomb racks. This may be accomplished by attaching to the cable 46 a cable 145 which actuates the bomb release devices simultaneously with the operation of the gas releasing devices 45.

In order to enable a ground crew to readily discover that the gas has been discharged either accidentally or during emergency operation, the discharge ports 66 and 66' may be provided with indicators such as a frangible disc or film of material adapted to be ruptured by the oil forced out from in back of the cylinder or by the gas accidentally released.

In operation, the hydraulic system normally is utilized for moving the piston 19 to effect opening or closing of the door or the like. When it is desired to open the door the valve member 41 of the valve is placed in the position shown in Figure 2 in solid lines so that hydraulic medium under pressure flows from the accumulator 25 through the pipe 34 to the valve 27 and through the valve passage 42 to the pipe 35 through which it is conducted to the valve 39. The pressure of the hydraulic medium, oil for example, will force the shuttle member 107 towards the left, if the member 107 is not already in that position, as indicated in full lines, whereby the port 102 will be closed and the port 104 will be opened and hydraulic medium enters the cylinder through the inlet 115 to move the piston 19 towards the left.

During normal operation of the apparatus, the valve member 52 of the control head 40 is urged towards the right by the spring 80 so that the ball 73 seats on the valve seat 75 and closes the outboard discharge passage 64. The ball 73, when in this position, is held away from the seat 77 of the oil return outlet port 57 and oil in back of the piston 19 will flow through the cylinder outlet 63, the pipe 62, the control head ports 61 and 57, the pipe 37, the valve passage 43 and the pipe 36 to the oil reservoir 21.

When it is desired to close the door or the like, the valve member 41 is moved into the position indicated in broken lines so that oil flows from the accumulator 25 through the valve passage 43, the pipe 37, the control head by way of ports 57 and 61, the pipe 62, and into the cylinder to move the piston 19 towards the right. The oil in back of the piston will flow from the cylinder through the port 115, the valve 39 by way of ports 112 and 104, the pipe 35, the valve passage 42, and the pipe 36 to the reservoir 21.

In operation during an emergency, the cable 46 is pulled toward the right to operate the gas releasing means 45 and at the same time to move the lever 134 in a position to enable the spring 139 to close the valve 120. The gas, preferably air at 1800 pounds per square inch, released from the container 16 travels through the pipe 47, the control head ports 59 and 55, and the pipe 56 to the valve 39 and is effective to move the shuttle member 107 towards the right. The member 107 when in this position closes the oil inlet port 104 and opens the air inlet port 102 so that air flows through the valve 39 and into the cylinder to move the piston 19 towards the left to effect opening of the door.

In the event, that the pressure of the air is more than a predetermined magnitude the valve member 92 of the valve 54 will be moved downwardly in opposition to the spring 94 and excessive pressure will be relieved. The vent valve 54 also may operate due to excessive pressure in the event the right hand end of the cylinder is partly filled with oil due to a partial stroke of the piston by hydraulic operation prior to emergency operation.

The air entering the control head 40, also is effective to move the valve member 52 towards the left in opposition to the spring 81, whereby the ball 73 fits against the seat 77 to close the oil port 57 and ball 73 moves away from the seat 75 to open the port 64. This enables oil in back of piston to be discharged to the atmosphere by flowing from the cylinder through the pipe 62, the control head ports 61 and 64, the pipe 65, and the discharge outlet which preferably is outboard of the fuselage. The pressure of the oil discharged will rupture the indicator at the outlet 66, whereupon landing, a ground crew will readily see that the emergency system has operated.

After the air has moved the piston into door operating position, the cable 46 is released and the return spring 136 moves the lever 134 into a position whereby the cam 132 moves the valve stem 131 downwardly and causes the valve member 130 to move away from the valve seat 129 to establish communication between the ports 121 and 125. Any air trapped in the system can now flow by way of the pipe 47, the T fitting 124 and the pipe 122 to the port 121, through the valve 120 and to the outboard discharging opening by way of pipe 126. The pressure of the air is adapted to rupture the indicator at 66', serving to indicate that the container has been discharged and requires replacement or recharging. The apparatus is now adapted to be operated hydraulically.

In the event that the air is released accidentally without operation of the pull cable 46 and the valve 120, the air will simply vent to the outboard and pressure, sufficient to operate the control head 40 and the valve 39, will not be built up in the line 47 leading to the control head.

From the foregoing description, it will be seen that the present invention provides a practical method and apparatus for effecting normal and emergency operation of doors or the like. The apparatus is so controlled that it can operate hydraulically or pneumatically. In an emergency, the air or other fluid high pressure medium is utilized to convert the apparatus from low pressure operation to high pressure operation in a rapid and foolproof manner. Suitable quick acting valve devices prevent oil from getting into the air system or air getting into the oil system. During high pressure operation the low pressure medium in back of the piston is discharged to lessen the resistance to movement of the piston and thereby speed up operation. The apparatus is protected from excessive pressures and will not operate should the air be released accidentally. After emergency operation the apparatus is again ready for hydraulic operation. The high pressure medium is vented after emergency operation and will not interfere with the hydraulic operation of the apparatus. The apparatus may be readily installed, tested, inspected and recharged. The parts of the apparatus are rugged in construction and can readily withstand the rough usage to which they may be subjected.

While the invention has been described in connection with using a high pressure fluid medium, such as gas, for effecting rapid operation of the piston 19 in an emergency, it may be desirable to use gas having a lower pressure than the hydraulic medium. This may be accomplished by increasing the effective area of the piston portion 70 of the control head member 52 and the bore 51 of the control head so that the pressure of the gas overcomes the spring 80. Also, the spring 80 may be made somewhat weaker to enable it to yield when a lower pressure is exerted upon the piston portion 70. Regardless of the pressure of the gas utilized, the gaseous medium facilitates emergency operation of the piston 19 in the event that the hydraulic system fails to function.

While my invention resides in certain principles of construction and operation which have been illustrated and described in connection with the accompanying drawings, it will be apparent to those skilled in the art that the invention may be embodied in other forms of construction without departing in any manner from the spirit and scope of the invention, and I therefore do not wish to be strictly limited to the disclosure, but rather to the scope of the appended claims.

I claim:

1. In apparatus of the class described, the combination of a cylinder, a fluid pressure operated piston in said cylinder, a valve operatively connected to one end of said cylinder for normally permitting the passage of a liquid pressure medium into said cylinder and adapted to shut off the liquid medium and permit the passage of a high pressure gaseous medium into said cylinder, and a second valve having a valve member therein normally positioned to permit the passage of the liquid pressure medium from the other end of the cylinder to a reservoir, said second valve being operable by the gaseous medium to move said valve member into a position to prevent the passage of liquid medium to the reservoir and to release the liquid medium in the other end of said cylinder.

2. In apparatus of the class described, the combination of a cylinder, a fluid pressure operated piston in said cylinder, a valve operatively connected to one end of said cylinder for normally permitting the passage of a liquid pressure medium into said cylinder and adapted to shut off the liquid medium and permit the passage of a high pressure gaseous medium into said cylinder, and a second valve having a valve member therein normally positioned to permit the passage of the liquid pressure medium from the other end of the cylinder to a reservoir, said second valve being operable by the gaseous medium to move said valve member into a position to prevent the passage of liquid medium to the reservoir and to release the liquid medium in the other end of said cylinder, and means associated with said second valve for relieving the pressure of the gaseous medium in the event the pressure thereof exceeds a predetermined magnitude.

3. In apparatus of the class described, the combination of a cylinder, a fluid pressure operated piston in said cylinder, means at both ends of said cylinder for alternately introducing a fluid pressure medium into said cylinder and conducting the medium from said cylinder to a reservoir, means for introducing into said cylinder at one end thereof a second fluid pressure medium having a much greater pressure than said first medium, means operable by said second medium for rendering said first medium introducing and conducting means ineffective at both ends of said cylinder while said second medium introducing means are effective, and means for effecting discharge of said first medium in the other end of said cylinder while said second medium is introduced.

4. In apparatus of the class described the combination of a cylinder, a fluid pressure operated piston in said cylinder, means at both ends of said cylinder for alternately introducing a liquid pressure medium into said cylinder and conducting the medium from said cylinder to a reservoir, means for introducing a high pressure gaseous medium into said cylinder at one end thereof, valve means operable by the gaseous medium for rendering said liquid medium introducing and conducting means ineffective at both ends of said cylinder while the gaseous medium is introduced, and valve means operable by the gaseous medium for effecting discharge of the liquid medium in the other end of said cylinder.

5. In apparatus of the class described, the combination of a cylinder, a fluid pressure operated piston in said cylinder, a source of fluid pressure medium, a reservoir, means at both ends of said cylinder for alternately supplying said medium to said cylinder and conducting said medium from said cylinder to said reservoir, valve means operatively connected in said means at both ends of said cylinder and being normally positioned for permitting the passage of said medium to said cylinder from said source and from said cylinder to said reservoir, means for supplying to one end of said cylinder a second fluid pressure medium having a much greater pressure than said first medium, said second medium being effective to operate said valve means to shut off communication between both ends of said cylinders and said first means, and means for effecting the release of said first medium in back of the piston while said second medium is supplied in front of the piston.

6. In apparatus of the class described, the combination of a cylinder, a fluid pressure operated piston in said cylinder, a source of pressure medium, a reservoir, a valve for normally admitting said medium to one end of said cylinder and permitting passage of said medium from said cylinder to said reservoir, a valve for normally admitting said medium to the other end of said cylinder and permitting passage of said medium from said cylinder to said reservoir, means for alternately connecting each of said valves with said source and said reservoir respectively, means for introducing an emergency pressure medium at one end of said cylinder, said last means being operatively connected to both of said valves to cause said emergency medium to operate both of said valves to prevent the passage of said first medium to and from either end of said cylinder while said emergency medium is being introduced, and valve means associated and operable with one of said valves for effecting the release of said first medium in back of said piston when said emergency medium is being introduced in front of said piston.

HENRY ERNEST HEIGIS.